United States Patent [19]

Horton et al.

[11] 4,209,236
[45] Jun. 24, 1980

[54] SOLAR CENTRAL RECEIVER HELIOSTAT REFLECTOR ASSEMBLY

[75] Inventors: Richard H. Horton, Schenectady; John J. Zdeb, Clifton Park, both of N.Y.

[73] Assignee: The United States of America as represented by the United States Department of Energy, Washington, D.C.

[21] Appl. No.: 844,400

[22] Filed: Oct. 21, 1977

[51] Int. Cl.² ............................................. G02B 5/08
[52] U.S. Cl. ..................................... 353/3; 126/424; 350/288; 356/371
[58] Field of Search .................... 353/3; 350/288, 310; 126/270, 271, 426, 451, 424, 425; 356/120, 371

[56] References Cited

U.S. PATENT DOCUMENTS

| | | | |
|---|---|---|---|
| 1,696,003 | 12/1928 | Harvey | 126/271 |
| 1,989,999 | 2/1935 | Niederle | 126/271 |
| 3,289,298 | 12/1966 | Standridge | 356/120 |
| 3,635,547 | 1/1972 | Rushing et al. | 350/288 |
| 3,867,019 | 2/1975 | Eyerman | 350/288 |
| 3,906,927 | 9/1975 | Caplan | 350/310 |

Primary Examiner—John W. Shepperd
Attorney, Agent, or Firm—R. V. Lupo; Roger S. Gaither; Clifton E. Clouse, Jr.

[57] ABSTRACT

A heliostat reflector assembly for a solar central receiver system comprises a light-weight, readily assemblable frame which supports a sheet of stretchable reflective material and includes mechanism for selectively applying tension to and positioning the sheet to stretch it to optical flatness. The frame is mounted on and supported by a pipe pedestal assembly that, in turn, is installed in the ground. The frame is controllably driven in a predetermined way by a light-weight drive system so as to be angularly adjustable in both elevation and azimuth to track the sun and efficiently continuously reflect the sun's rays to a focal zone, i.e. central receiver, which forms part of a solar energy utilization system, such as a solar energy fueled electrical power generation system. The frame may include a built-in system for testing for optical flatness of the reflector. The preferable geometric configuration of the reflector is octagonal; however, it may be other shapes, such as hexagonal, pentagonal or square. Several different embodiments of means for tensioning and positioning the reflector to achieve optical flatness are disclosed. The reflector assembly is based on the stretch frame concept which provides an extremely light-weight, simple, low-cost reflector assembly that may be driven for positioning and tracking by a light-weight, inexpensive drive system.

14 Claims, 14 Drawing Figures

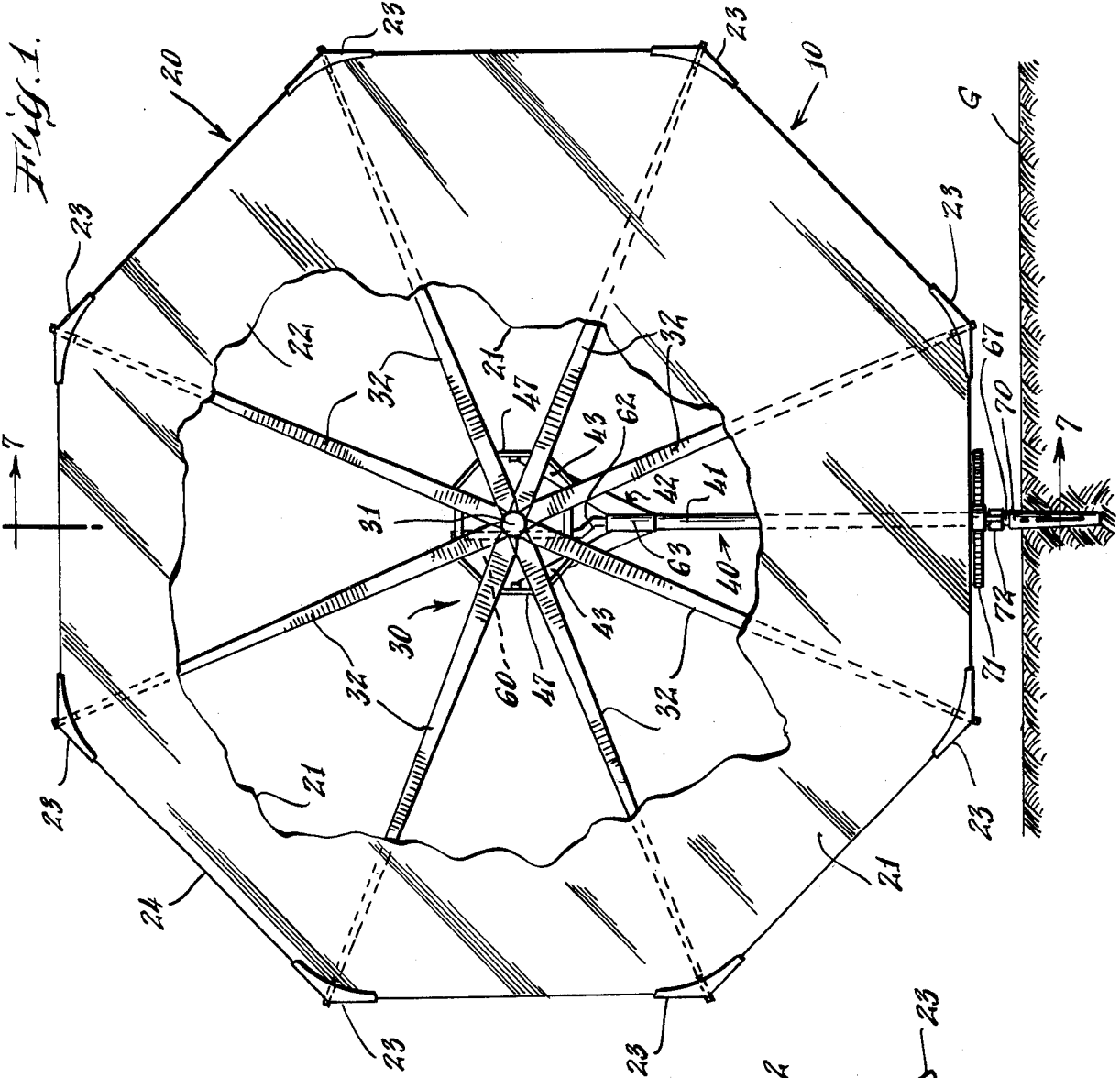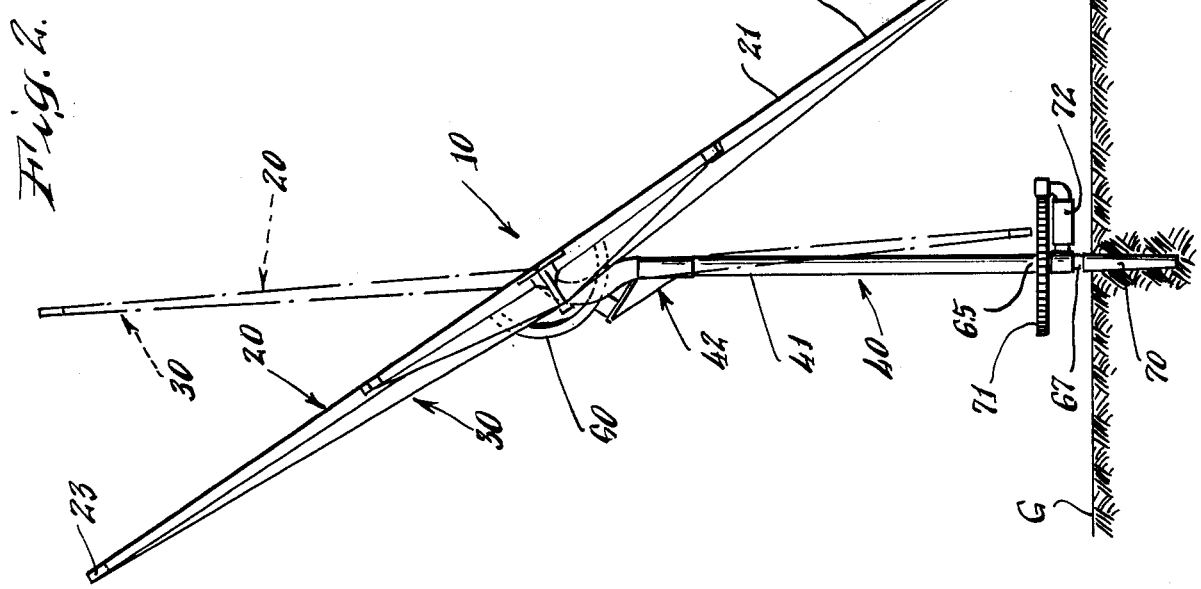

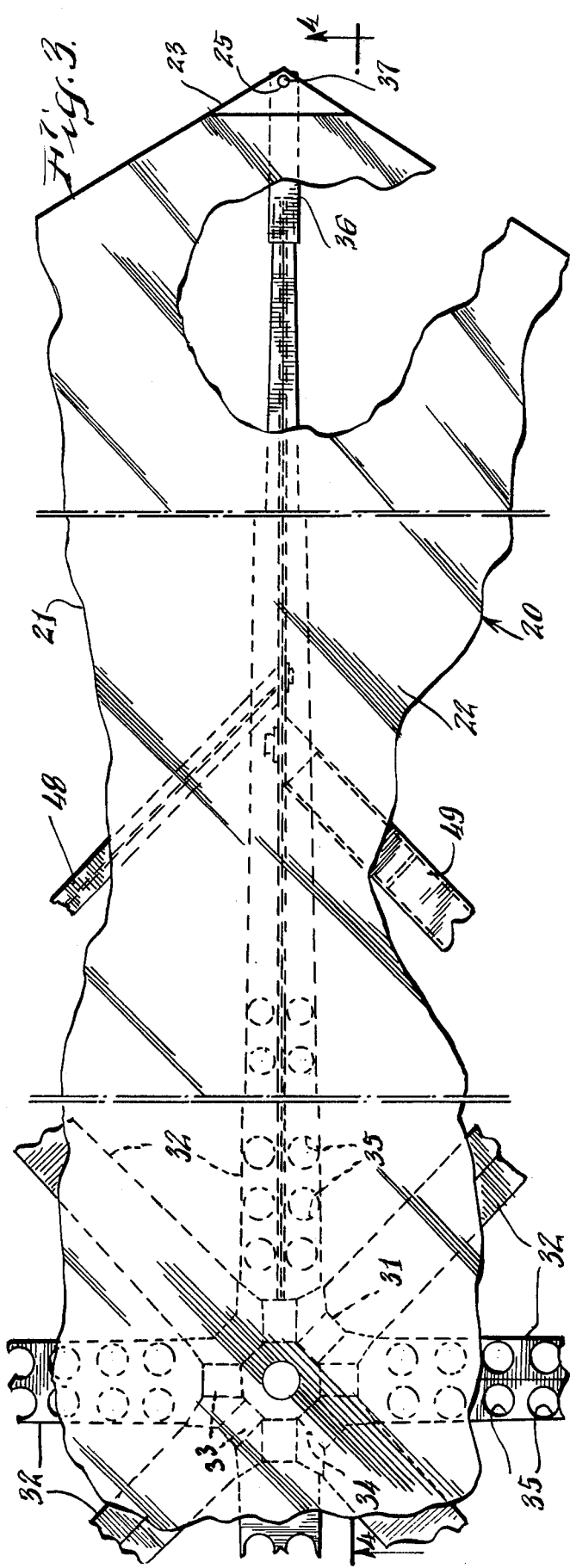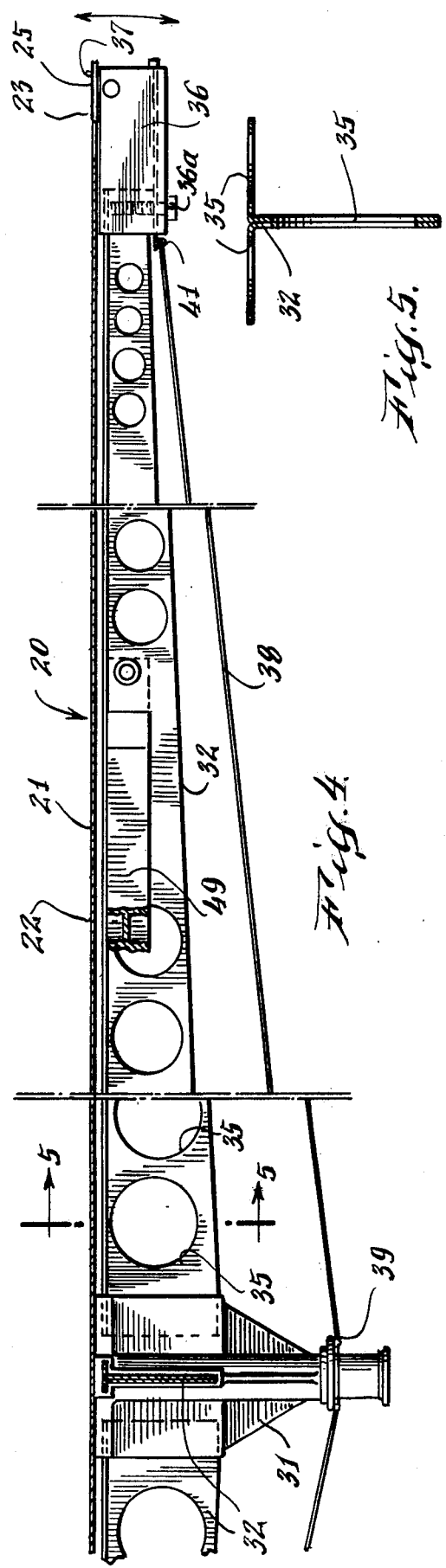

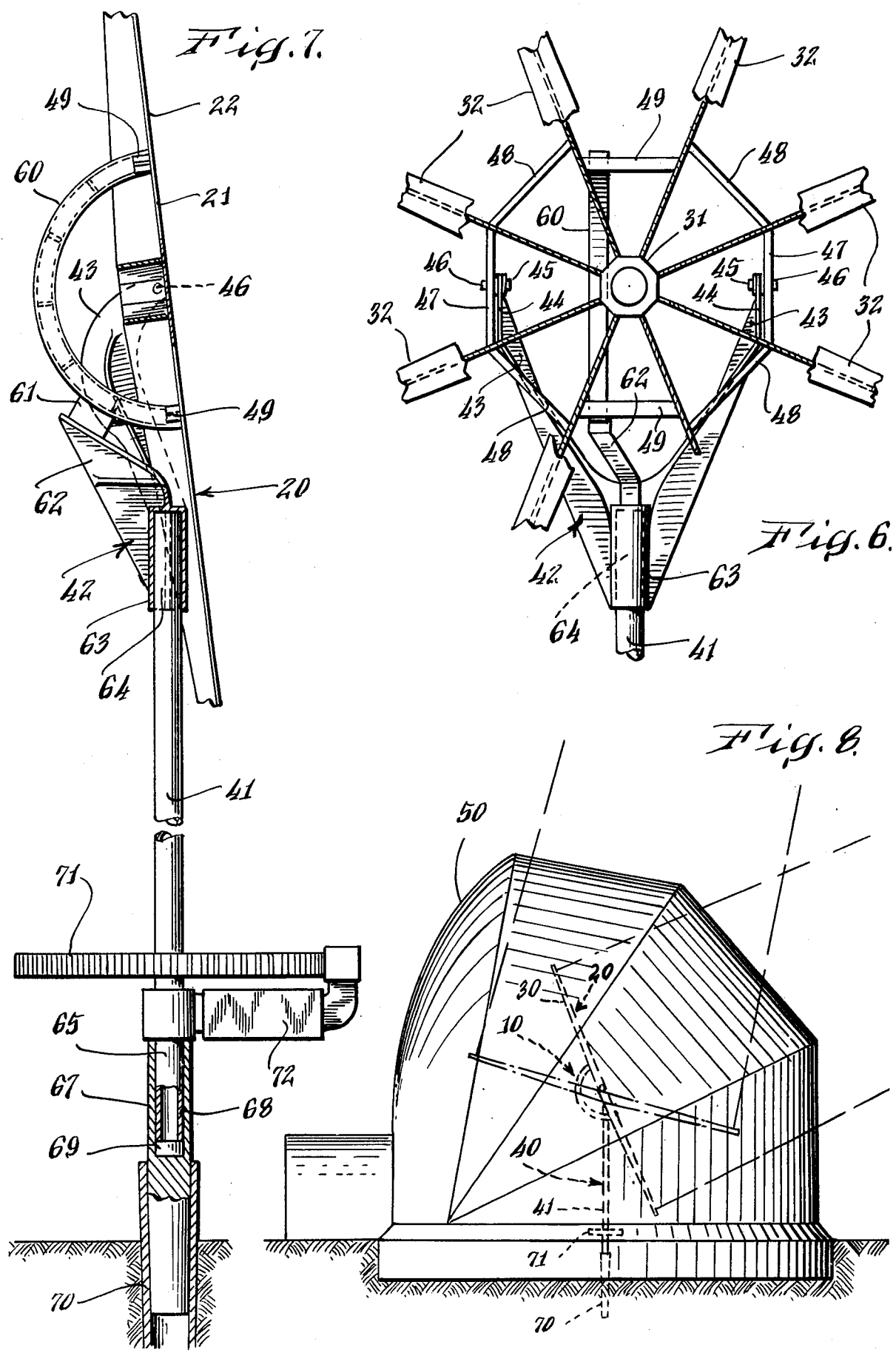

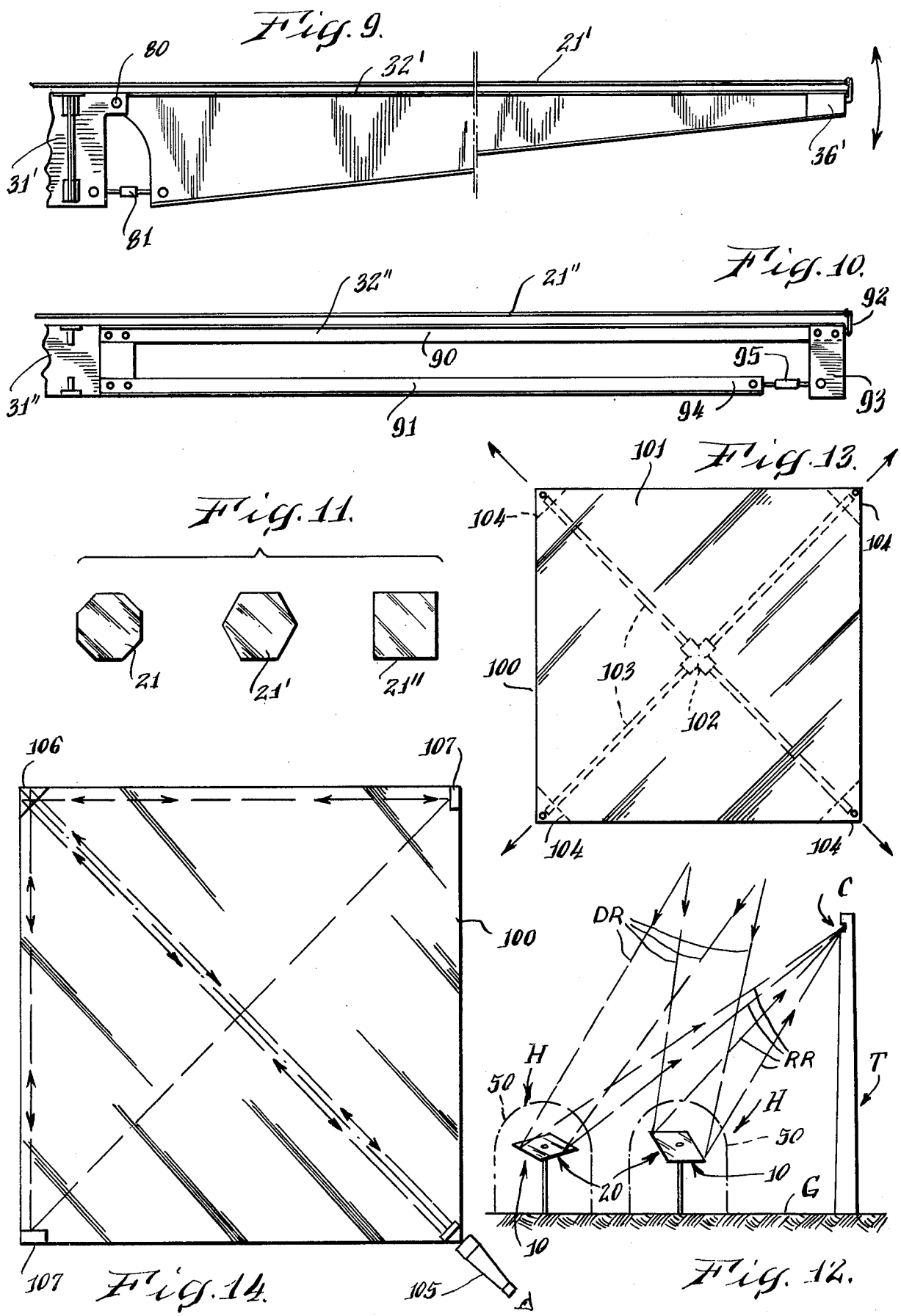

SOLAR CENTRAL RECEIVER HELIOSTAT REFLECTOR ASSEMBLY

BACKGROUND OF THE INVENTION

The invention relates generally to solar energy utilization systems and particularly to an improved heliostat which admirably lends itself to incorporation into a solar central receiver system, which may form part of a solar energy electrical power generation system.

It seems to be commonly assumed or agreed that one of the most pressing problems facing the nation at this time in history is that of energy and, more particularly, locating feasible energy sources that are economically competitive alternatives to traditional fuels, such as fossil fuels. There has been much research and development effort and activity directed at the development of solar central receiver electrical power generation systems. In one such system, a large field or array of individually driven and controlled mirror-like devices forming part of heliostats reflect the sun's rays to a common, focal, heat absorbing zone, i.e. the central receiver, which may be part of a boiler/superheater. The central receiver is a target for the reflected sun's rays, which are highly concentrated at the central receiver and may be collected at high temperatures in excess of 500 degrees Centigrade and subsequently used through known systems, such as steam-turbine driven electrical generating plants, to produce electricity or otherwise to provide thermal energy for other systems. Both government and industry recognize that before a solar energy electrical power generating system becomes a practical reality, it must be economically feasible, i.e. the cost of generation of a unit of electricity must be in a cost range that is comparable to or better than that of contemporary electrical power generating systems. Studies have indicated that the cost of heliostats is the largest factor in the overall cost of such a system. It has been concluded that the development of an operationally acceptable heliostat which lends itself to ease of manufacture in quantity production, ready shipment to site, easy assembly and installation at site, and low cost maintenance over the expected life of the system, is highly desirable. Such an improved heliostat must produce a significant reduction in initial cost and maintenance costs over the prospective life of the system.

SUMMARY OF THE INVENTION

A heliostat is a device which includes an optical reflective surface that is appropriately mounted, driven and controlled so as to continuously track the sun during the course of the day and reflect the sun's rays to the central receiver. Although a complete heliostat comprises an assembly of components which includes the reflective surface, support structure therefor, a drive and control system therefor, and a means to protect particularly the reflective surface from injurious environmental conditions, such as wind, sand, snow and rain, likely to be encountered at the site of installation, this invention deals primarily with the provision of an improved heliostat reflector assembly and some closely related heliostat components, which permit and contribute to the design of an overall improved heliostat.

Central receiver heliostat reflector assemblies according to the invention herein are extremely simple, light-weight, use cost effective materials, made of few parts, permit the use of low cost mass production techniques, eliminate shipping problems to the installation site and lend themselves to semiautomatic and easy installation at the site with minimum labor. The aforesaid attributes provide an extremely low initial cost heliostat reflector assembly and are produced by applicant's "stretch-frame" concept. This concept contemplates the provision of a stretchable, polygonal sheet of plastic material, preferably Mylar, one side of which is capable of reflecting the sun's rays, that is selectively stretchably mounted on an adjustable frame comprised of a central hub and a plurality of radially extending, spoke-like beams, the radially outer ends of which engage peripheral portions of the sheet and are arranged selectively to tension and position the sheet to stretch it and translate it into a condition of optical flatness.

The extremely light-weight heliostat reflector assembly constructed in accordance with the invention lends itself to being supported by a simple pipe pedestal assembly which can be automatically inserted into the ground, and driven by a low cost, mass-produced, linear stepping motor drive system which, in turn, lends itself to being controlled by an accurate positioning microprocessor, which can be mass produced and operates on electronic position pulse counting techniques. Further, all elements of the drive and control systems can be factory installed and mounted on the pedestal frame assemblies.

OBJECT OF THE INVENTION

It is an object of the invention to provide a lightweight, inexpensive heliostat reflector assembly that permits low cost mass production techniques to be employed for the complete system; part and sub-assembly sizes small enough for conventional shipping, and a concept that lends itself to semiautomatic and simple installation and easy maintenance.

It is a further object of the invention to provide an improved heliostat reflector assembly operating on the stretch frame concept, that is, one which includes a plastic sheet that is stretched into a condition of optical flatness and has one light reflecting side, which can be simply adjusted for tension and for flatness of the reflector. Desirably the assembly further includes a built-in optical flatness alignment system.

It is a still further object of the invention to provide an improved light-weight heliostat reflector assembly that lends itself to being supported on a simple pipe pedestal assembly which permits automatic insertion into the ground by a machine, and driven and controlled by light-weight drive and control components that are factory installed and mounted on the reflector and pedestal assembly.

It is another object of the invention to provide an improved light-weight heliostat reflector assembly that lends itself to being driven and controlled to track the sun by highly accurate potentially low cost mass produced electronic microprocessors and linear stepping motor drives.

Other and more particular objects of the invention will in part by obvious and will in part appear from a perusal of the following description of the preferred embodiments and the claims, taken together with the drawings.

DRAWINGS

FIG. 1 is a front elevational view of a heliostat reflector assembly according to the invention herein shown installed in the ground at the site for operation, with a central portion of the reflector being cut away to show portions of the frame and the support and drive means therefor, and showing in section some of the ground in which the reflector assembly is mounted.

FIG. 2 is a side elevational view looking from the left in FIG. 1 showing the reflector frame in dot-dash lines in a position to which it may be adjusted.

FIG. 3 is an enlarged fragmentary front elevational view of the reflector assembly.

FIG. 4 is a sectional view taken substantially along the lines 4—4 of FIG. 3.

FIG. 5 is a sectional view taken substantially along the lines 5—5 of FIG. 4.

FIG. 6 is an enlarged fragmentary view of the central portion of FIG. 1 with portions broken away to show some of the details of the central portion of the frame, the yoke support and part of the drive means.

FIG. 7 is a sectional view taken substantially along lines 7—7 of FIG. 1.

FIG. 8 is a side elevational view of a reflector assembly installed for operation on site within a protective enclosure.

FIG. 9 is a view generally similar to FIG. 4, but showing a modified beam construction.

FIG. 10 is a view generally similar to FIG. 4 showing a further modified beam construction.

FIG. 11 is a schematic view showing three of the many possible polygonal configurations that the reflector sheet may take.

FIG. 12 is somewhat of a pictorial view illustrating two reflector assemblies and a central receiver disposed in a heliostat field and schematically showing the sun's rays being reflected by the reflector assemblies to the central receiver.

FIG. 13 is a front elevational view of a square reflector having a frame with four beams; and FIG. 14 is a view similar to FIG. 13, but enlarged and showing a built-in optical flatness alignment system.

DESCRIPTION OF PREFERRED EMBODIMENTS

In FIGS. 1 and 2 the improved reflector assembly according to the invention is generally designated by reference numeral 10, and comprises a reflector 20 supported on a frame 30 which, in turn, is mounted on a pedestal supporting assembly 40 which, in turn, is mounted at its lower end directly in the ground G at the installation site. In FIG. 8, the reflector assembly 10 is shown mounted within a protective enclosure 50. For purposes of this application and description, the reflector assembly 10 and its protective enclosure 50, along with the drive system, may be considered as comprising a heliostat H. In FIG. 12, two heliostats H forming part of a larger number of heliostats disposed in a desired array, will be seen in pictorial fashion, illustrated in position to reflect the sun's direct rays DR as reflected rays RR to a central receiver C disposed at the top of a tower T.

Reflector 20 comprises a sheet 21 which is polygonal in outline, preferably octagonal as shown in FIGS. 1-7, and may be conveniently precut in a factory. The sheet 21 is made of a stretchable material, preferably a stretchable plastic film, Mylar being a very well suited plastic material. One side of sheet 21 is formed so as to be light reflective. This can be effected by forming a silvered or aluminized face on the side 22 of the sheet 21. The corners 23 of the sheet 21 are reinforced, as by the application of additional material or the provision of rigid plastic or metal corner structure to facilitate attachment of tensioning devices to be explained subsequently for stretching and translating the sheet 21 into a condition where the reflective side 22 is optically flat. If desired, the peripheral edge of sheet 21 may be strengthened further as by being rolled and bonded. Each of the corners 23 has an opening 25 as can best be seen in FIGS. 3 and 4, for receiving a hook of a tensioning device carried by the frame 30.

Reflector 20 is mounted on frame 30 in a manner so as to be selectively tensioned and positioned by the frame 30 into a condition wherein the reflector side 22 is optically flat. The frame 30, herein referred to as a stretch frame, comprises a central hub 31 which is rigid and conveniently may be molded of a suitable plastic or metal material. Eight spoke-like beams 32 are rigidly secured at their radially inner ends to the hub and extend radially outwardly therefrom. The connection of the inner ends of the beams at the hub may be effected by mounting stubs 33 that are received in sockets 34 formed in the hub 31 and dimensioned so as to have a press fit. The beams 32 are preferably made of a lightweight metal, may be conveniently formed in Tee cross-section as shown in FIG. 5 or in tubular or other shapes, and have many cut out portions 35 formed in both legs of the Tee throughout their radial extents to further lighten the beams. Tensioning devices 36 are rigidly mounted on the radially outer ends of beams 32 and include selectively adjustable, spring-loaded hooks 37 that individually extend respectively into the openings 25 in the reflector corners 23 to thereby provide a preload radially outward tension on the reflector sheet 21 to stretch it. The individual tensioning devices 36 selectively may be adjusted and balanced so as to dispose the reflector side 22 into a condition of optical flatness. As tension is applied, the sheet is increasingly stretched and is returned to its original manufactured flatness. Further the beam ends are caused to translate in position relative to each other in the plane of the reflective surface. The tensioning of the reflector sheet 21 by the beams 32 produces a load which may be counterbalanced by the guy wires 38. One guy wire 38 is associated with each beam 32, and secured at its radially inner end to the ring 39 supported by the hub 31 and at its radially outer end to a fixed hook on the tensioning device. A translation screw 36a is provided in each tensioning device 36 to permit movement of the device with respect to the beam end in the directions of the arrows shown in FIG. 4.

The assembled reflector 20 and stretch frame 30, because of their light weight may be mounted on a light-weight, pipe pedestal assembly 40, which essentially comprises a plurality of vertically axially-aligned cooperating pipe members. The lowest pipe is securely mounted in the ground G, and the pedestal assembly 40 provides a secure support for the reflector-stretch frame assembly. The pedestal assembly 40 extends vertically upwardly from the ground and is formed of cooperating pipe portions and supports a light-weight drive system so as to permit selective angular adjustment of the reflector and stretch frame assembly in both elevation and azimuth angles.

The pedestal assembly 40 essentially comprises, an upper pipe 41, which rigidly carries at its upper end a yoke 42, and at its lower end is rotatably mounted in a lower pipe section. Yoke 42 pivotally supports on a horizontal axis the stretch frame 30 at its central area.

The yoke 42 comprises a pair of yoke legs 43 which diverge upwardly and extend into straight parallel leg portions 44 which, in turn, support aligned bearings 45. The frame 30 in its central area has a pair of mounting bars 47 each of which is rigidly secured between and to a pair of adjacent beams 32. The bars 47 carry a pair of bearing pins 46 which are rotatably received in the bearings 45. The bottom portion of the yoke 42 has a socket formation 63, which is press-fit on to the upper end 64 of the upper pipe 41 to effect a rigid connection.

The arrangement is such that the yoke 42 supports the stretch frame 30 at its central area on a horizontal axis for pivotal movement. The rigid connection of the bars 47, which are spaced, parallel and generally vertically extending, to the beams 32, and the rigid connection of strengthening bars 48 and 49 to their adjacent beams 32, provide a central cage-like support of strength and rigidity for the stretch frame 30.

As can best be seen in FIGS. 6 and 7, a semi-circular drive wheel 60, forming a part of a drive system for the reflector stretch frame assembly 30, is rigidly secured to the support bars 49. The latter are spaced, parallel and generally horizontally extending and, therefore, the drive wheel 60 extends generally vertically. Associated with the drive wheel 60 is a linear stepping motor drive 61, which is rigidly carried by a central leg 62 of the yoke. The operational arrangement of the drive wheel 60 and motor drive 61 is such as to provide for selective adjustment of the elevation angle of the stretch frame 30 and the reflector 20 by controlled actuation of the motor drive 61 which causes the drive wheel to move incrementally and rotate, thereby moving the frame-reflector assembly angularly in elevation.

With reference to FIGS. 1, 2 and 7, the remainder of the pedestal assembly 40 and the system for driving the stretch frame-reflector assembly to adjust its azimuth angle will become apparent. The lower end 65 of the upper pipe 41 is aligned with and rotatably mounted in lower pipe 67 for controlled angular adjustment relative to it. This may be conveniently effected, as can be seen in FIG. 7, by providing an upwardly opening socket 68 in the lower pipe 67, which internally supports a bearing 69 at its bottom that rotatably supports the lower end 65 of the upper pipe 41 for relative rotational movement. The bearing 69 may be a needle bearing or other suitable end bearing. The lower pipe 67 is rigidly secured in a mating mounting pipe 70 which is driven into the ground G. A circular drive wheel 71 is securely attached to and carried by the upper pipe 41 at its lower end. A linear stepping motor drive 72 is rigidly attached to and mounted at the upper end of the lower pipe 67 in operational relationship to the drive wheel 71. The arrangement is such that the upper pipe 41 may be selectively driven about its vertical axis by the controlled motor drive 72 through the drive wheel 71 to selectively adjust the azimuth angle of the frame-reflector assembly.

The specific control system for controlling the elevation and azimuth angle drives forms no specific part of our invention being claimed herein. A suitable control system is disclosed and claimed in the co-pending application of R. H. Horton entitled "Solar Receiver Heliostat Reflector Having a Linear Drive and Position Information System", Ser. No. 844,403, filed concurrently herewith. The control system disclosed in that application generally includes a micro-computer at a central location removed from the heliostats for controlling the operation of the linear stepping motors in a predetermined manner to provide for controlled adjustment of the drive wheels for tracking the sun during the course of its daily travel. A significant aspect of the invention herein is that because of the light-weight reflector, a light-weight frame may be employed, which, in turn, permits the utilization of light-weight drive wheels and linear stepping motors to drive the frame-reflector assembly.

Arrangements are available or may be devised for individually manually controlling the drive of the frame-reflector assembly, as well as for continuously sensing the sun's position and taking corrective action to both adjust the position of the frame-reflector assembly and the control program in the mini-computer. Furthermore, indicators for drive fault or failure detection can be provided in the event of malfunction. None of these later systems constitutes a specific part of our invention.

FIG. 11 illustrates three representative polygonal shapes that the reflector sheet may take. In addition to the octagonal sheet 21 heretofore described, there is illustrated an hexagonal sheet 21' and a square sheet 21". It should be clearly understood that the invention is not limited to any specific polygonal configuration of the reflector sheet, but that the octagonal shape described in detail is considered to be optimum and highly effective.

FIGS. 9 and 10 illustrate two modified beam arrangements for tensioning the plastic sheet. In FIG. 9 common parts to those of the FIGS. 1–8 embodiment will be referred to by the same reference numerals with a prime (') added. There is illustrated in FIG. 9 a beam 32' that is pivotally secured at one of its radially inner sides to hub 31' at 80. It includes an adjustable turnbuckle mechanism 81 disposed at the other of its radially inner sides, mounted between it and the hub 31'. The relative tilt of the outer end of the beam 32' may be adjusted in minute fashion by adjusting the turnbuckle mechanism 81 which functions as a micrometer adjustment to translate the end of the beam perpendicular to the plane of the reflector to permit optical alignment. Tension is achieved through adjustment of a spring loading screw in the hook support of tensioning device 36'.

FIG. 10 illustrates another arrangement in which common parts of the beam will be designated by the same reference numeral with a double prime ("). The beam 32" is formed of two separate elongated members 90–91, which are secured at their radially inner ends to each other and to the hub 31". At the radially outer end of the member 90, there is disposed a spring loaded hook 92 and a laterally extending rigid bracket 93. The hook 92 engages and selectively applies tension to a corner of the reflector sheet 21". Between the radially outer end 94 of the member 91 and the lateral free end of the bracket 93, a fine adjusting turnbuckle mechanism 95 is disposed. The latter may be selectively adjusted to provide micrometer like adjustment of the length of member 91 of the beam 32" to cause the overall beam to bow and adjust the lateral position of the associated corner of the reflector sheet 21".

FIGS. 13 and 14 illustrate an optical flatness alignment testing and setting system, which optionally may be built into the reflector assembly. For ease of explanation, the system is illustrated as related to a square reflector sheet 100. If an octagonal sheet is employed, two systems, mounted out-of-phase, may be employed to insure optical flatness of all eight corners of the reflector sheet. In operation it is essential that the reflective side 101 of the reflector sheet 100 be optically flat. Due to manufacturing inaccuracies or unbalanced tension on the corners of the reflective sheet, it is possible for the four corners of the frame not to fall in a common plane, hence the reflector sheet to be out of optical flatness. We have devised a simple mechanism which may be built into the reflector frame to readily measure for optical flatness within an accuracy range of 1 micron.

In FIG. 13 the reflector sheet 100 is shown mounted on a stretch frame comprising a hub 102 and four spoke-like radiating beams 103 connected, respectively, at their radially outer ends, through adjustable tensioning devices to corners 104. The corners 104 are reinforced and are operatively selectively tensioned by devices (not illustrated) similar to tensioning devices 36 as previously described hereinabove to provide for the adjusting of the beams and tensioning of the reflector sheet 100 in the direction of the arrows.

With particular reference to FIG. 14, the optical alignment system construction and operation may be ascertained. On one corner of the reflective side 101, a small telescope 105 is attached. At the opposite corner of the reflector side 101, a right angle prism 106 is installed. This prism includes a 90 degree face portion that has inscribed on it a reference hairline which is positioned a similar distance from the reflector side 101 as a hairline which is formed in the telescope. At each of the other two corners 107, a target is mounted which has a hairline formed in it parallel to the reflector side 101 the same distance as the hairlines of the telescope 105 and prism 106. In operation, the tensioning devices are individually adjusted so as to cause all four hairlines of the telescope 105, prism 106 and targets 107 to be visible and superimposed. If this does not occur, individual adjustments are made by the tensioning devices at the appropriate corners to bring the hairlines into superimposition. To facilitate identification of corners which require adjustment, the targets may be suitably colored. Since the hairlines may be drawn to a dimension of a micron or less, when all hairlines are superimposed, the four corners of the frame can be assumed to be coplanar within 1 micron and the reflective side 101 in optical flat alignment.

In view of the foregoing, it should be apparent that we have provided an extremely light-weight, readily assemblable heliostat reflector assembly which operates on the stretch frame concept of employing a light-weight stretchable sheet having a light reflecting side on a light-weight selectively stretchable frame. Because of the simplicity and lightness of our stretch frame-reflector assembly, it may be mounted on a light-weight pipe pedestal assembly that is directly installed in the ground and which, because of the overall lightness of the stretch frame-reflector-pedestal assembly, may employ linear stepping motor drives which are extremely accurate, light weight devices that eliminate the need for heavy components, such as gear reducers required by conventional heavy reflector assemblies. These desirable linear stepping motor drives lend themselves to electronic position pulse counting techniques and control by a minicomputer that is programmed so as to continually adjust, through the linear stepping motor drives, the elevational and azimuth angles of the reflector-stretch frame assembly to track the sun during the course of its daily movement. All of the reflector, stretch frame, pipe pedestal and linear stepping motor drive systems may be factory mass produced at low cost, lend themselves to ease of shipment to the heliostat field site and are assemblable with minimal effort at the site. Furthermore, the simplicity and lightness of their constructions permits for ready and low cost maintenance. The heliostat reflector assembly provided by our invention satisfies all of the objects of our invention. As it will be apparent to those skilled in the art, various changes and modifications of the invention described herein can be made without departing from the spirit and scope of the invention, which is limited only by the following claims.

We claim:

1. A heliostat reflector assembly for a solar energy system comprising:
   A. a stretchable planar reflector;
   B. a frame supporting said reflector, said frame having selectively operable means for stretching said reflector and positioning said reflector in a condition of optical flatness including a plurality of tensioning devices disposed about the periphery of said reflector and means mounting said tensioning devices so as to be selectively individually adjustable relative to said frame in a direction generally normal to the plane of said reflector, said frame comprising a central hub having a plurality of elongated spoke-like beams, each having its inner end secured to and each radiating outwardly from said hub, said beams being individually secured to their radially outer ends to said reflector at spaced points near the periphery of said reflector by said tensioning devices, one associated with each of said beams, each of said beams being pivotally secured to said hub at one axial side of its inner end, and each of said tensioning devices comprising an adjustable turnbuckle mechanism disposed between and connected to said hub and the radially inner end of a beam at its other axial side to permit selective adjustment of the position of the radially outer end of the beam; and
   C. means for supporting said frame.

2. A heliostat reflector assembly as defined in claim 1 wherein said stretchable reflector comprises a sheet of stretchable material that is light reflective on one of its sides.

3. A heliostat reflector assembly as defined in claim 2 wherein said sheet is polygonal.

4. A heliostat reflector assembly as defined in claim 2 wherein said reflector has at least four corners disposed at the corners of a square and said heliostat includes means for testing for the optical flatness of said reflector.

5. A heliostat reflector assembly as defined in claim 4 wherein said optical flatness testing means comprises a sighting member at one of the four corners, a prism member at the diagonally opposite corner, and a target member at each of the remaining two corners, and a hairline is formed in each of said members which is disposed to be located in a common plane spaced from and parallel to said sheet when the latter is in an optically flat condition.

6. A heliostat reflector assembly as defined in claim 1 wherein said reflector comprises a sheet of stretchable plastic material having one of its sides formed with a light reflective material.

7. A heliostat reflector assembly as defined in claim 1 wherein said reflector comprises a sheet of stretchable Mylar aluminized on one of its sides.

8. A heliostat reflector assembly as defined in claim 1 wherein each of said tensioning devices comprises an adjustable spring-loaded device mounted on a beam at its radially outer end arranged to apply a radially outward force on said reflector, the effect of all of the forces when properly balanced and when said tensioning devices are properly positioned in a direction generally normal to said reflector being to tension and position said reflector into optical flatness.

9. A heliostat reflector assembly as defined in claim 1 wherein each of said beams comprises a pair of spaced elongated members that are connected at their adjacent ends; and one of said members includes an adjustable turnbuckle mechanism to permit selective lengthening or shortening of it to thereby adjust the lateral position of the other member.

10. A heliostat reflector assembly as defined in claim 1 wherein said frame supporting means comprises a pipe pedestal.

11. A heliostat reflector assembly as defined in claim 10 wherein said pedestal comprises
a pipe having secured at its upper end a yoke, and said reflector includes said hub which is pivotally secured to said yoke.

12. A heliostat reflector assembly as defined in claim 11 wherein a drive wheel is rigidly secured to said frame, and said pipe supports a linear stepping motor positioned in operative association with said drive wheel, whereby the angular position of said frame relative to said pipe may be selectively adjusted by activation of said motor.

13. A heliostat reflector assembly as defined in claim 12 wherein said hub is pivotal about a horizontal axis, whereby said frame is adjustable angularly in elevation.

14. A heliostat reflector assembly as defined in claim 13 wherein said pipe is pivotally mounted for selective rotation about a vertical axis so as to permit adjustment of the azimuth angle of said frame; an azimuth drive wheel is rigidly secured to said pipe, and a second linear stepping motor is positioned in operative association with said azimuth drive wheel, whereby the azimuth angle of said frame is adjustable by activation of said second motor.

* * * * *